(12) United States Patent
Balcer

(10) Patent No.: US 9,759,134 B2
(45) Date of Patent: Sep. 12, 2017

(54) PROCESS FOR PREVENTING ROTATING STALL AND SURGE IN A TURBOMACHINE

(71) Applicant: GE Energy Products France SNC, Belfort (FR)

(72) Inventor: Laurent Balcer, Echenans (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 425 days.

(21) Appl. No.: 14/515,639

(22) Filed: Oct. 16, 2014

(65) Prior Publication Data
US 2015/0176499 A1 Jun. 25, 2015

(30) Foreign Application Priority Data

Dec. 23, 2013 (FR) ...................... 13 63381

(51) Int. Cl.
*F04D 27/02* (2006.01)
*F02C 9/18* (2006.01)
*F01D 21/14* (2006.01)

(52) U.S. Cl.
CPC ............ *F02C 9/18* (2013.01); *F01D 21/14* (2013.01); *F04D 27/023* (2013.01); *F04D 27/0223* (2013.01)

(58) Field of Classification Search
CPC .......... F01D 17/00; F01D 17/10; F01D 17/12; F01D 17/16; F01D 17/1662; F01D 17/165; F01D 17/167; F01D 21/14; F01D 17/105; F02C 9/18; F04D 27/023; F04D 27/009; F04D 27/0207; F04D 27/0215; F04D 27/0223; F04D 27/0253
See application file for complete search history.

(56) References Cited

U.S. PATENT DOCUMENTS 3,641,766 A * 2/1972 Uehling ................. F02C 3/06
239/265.17
2011/0142602 A1* 6/2011 Adhami ............... F01D 17/162
415/159

FOREIGN PATENT DOCUMENTS

FR 1472085 A * 3/1967 .......... F04D 19/024
JP 62126296 A * 6/1987

* cited by examiner

*Primary Examiner* — Richard Edgar
(74) *Attorney, Agent, or Firm* — Eversheds Sutherland (US) LLP

(57) ABSTRACT

The present application provides a process for preventing rotating stall and surge in a turbomachine compressor. The compressor may include air extraction pipes connecting the compressor to a turbomachine exhaust area or to the atmosphere, at least one of the pipes is fitted with a flow regulation valve, and each valve has an adjustable degree of opening. The process includes, for at least one of the valves, a complete opening command when the compressor rotation speed is less than a predetermined threshold value beyond which there is no longer any risk of rotating stall and surge and a command for lowering the degree of opening of the valve when the rotation speed of the compressor exceeds the threshold value.

9 Claims, 4 Drawing Sheets

PROCESS FOR PREVENTING ROTATING STALL AND SURGE IN A TURBOMACHINE

TECHNICAL FIELD

The present application and the resultant patent relate generally to the field of turbomachines. More particularly, this application concerns a process that prevents rotating stall and surge in a turbomachine compressor, particularly a gas turbine compressor. The application is aimed at a turbomachine that allows for implementing this process.

BACKGROUND OF THE INVENTION

Turbomachine compressors must increase the gas pressure therein. The compressors are divided into two main families, i.e., centrifugal compressors and axial compressors. Axial compressors are differentiated by their low compression ratio per stage and their very high volume flow, while centrifugal compressors have a higher compression rate. The compression is carried out in a certain number of stages, placed in sequence. Each stage may include of a rotary blade crown (15 rotors) and a stator blade crown (stator).

Two types of aerodynamic instability in the compressors may occur: surge and rotating stall. Surge is a violent aerodynamic phenomenon that intervenes in the compressors. Surge concerns aerodynamic instability that gives rise to considerable longitudinal waves and can extend up to a reversal in the direction of flow in the compressor. Surge is a phenomenon that may prove to be destructive for the compressor blades. Surge may be characterized by an out-and-out stalling of the compressor blades.

Rotating stall is also an aerodynamic instability affecting the compressor. Rotating stall is characterized by the presence of one or more localized fluid pockets (also called stall cells or pockets), spreading in the circumferential direction of the compressor, at a speed generally less than the rotation speed of the compressor. Thus, rotating stall corresponds to a partial stall of the compressor, which is characterized by a performance loss. The partial stall may be stable and may be translated by stagnation or unscrewing. Rotating stall generally appears during the start-up or re-ignition phases of the turbomachine and at the time of shutdown.

Rotating stall and surge are related, insofar as rotating stall can precede or co-exist with surge. At the time of start-up and shutdown of a compressor, the intermediate rotating speed, particularly lying between about 40% to about 70% of the rated rotation speed of the compressor, may cause a significant risk of rotating stall and surge. Discharge of a part of the air flow of the compressor via one or several anti-surge valves connecting the compressor to the exhaust may prevent this phenomenon.

Thus, it is known from U.S. Pat. No. 7,972,105, a compressor air flow extraction system and method over several stages with several valves that ensure a maximum extraction of the flow during the start-up or shutdown phases of the compressor, in addition to air regulation at the compressor inlet, in order to avoid the rotating stall areas. The valves are then closed once a rated speed is attained. FIG. 1 is a diagram representing the change in different cases of the pressure Ps ratio at the compressor outlet on the pressure Ps at the compressor inlet, according to the air mass flow at the compressor inlet, shows the effect of opening the valves that extract air from the compressor towards the exhaust. Air extraction may avoid the surge area, located above curve A, which is the operating curve limit of the compressor. Curve B1 is the operating curve when the valves are closed. Curve B2 is the operating curve when the valves are open.

In particular, air extraction avoids the critical area D associated with the critical point Pc (also called "pinch point" in English). Critical point Pc is the air flow value for which curve A is the closest of curve B1. It typically occurs for the rotation speed of the compressor lying between about 40% to about 70% of the rated rotation speed of the compressor.

However, the process described in U.S. Pat. No. 7,972,105 has as the disadvantage that it requires large sized air extraction pipes with high fluid speed and high fluid temperatures. These air extraction pipes lead to encumbering and costly devices and a risk of heavy vibrations therein. This invention aims at resolving this disadvantage.

SUMMARY OF THE INVENTION

Thus, this invention has as an object a process to prevent rotating stall and surge in a turbomachine compressor, with air extraction pipes connecting the compressor, for example, at several extraction points, a turbomachine exhaust area, or in the atmosphere. At least one of the pipes is fitted with a flow regulation valve. Each valve has an adjustable degree of opening. The process, according to the invention, for at least one of the valves, may include:
- a complete opening command of the valve when the compressor rotation speed is less than a predetermined threshold valve beyond which there is no longer any risk of rotating stall and surge, and
- a command for lowering the degree of opening of the valve when the rotation speed of the compressor exceeds the said threshold value.

Thus, the opening of the valve avoids the critical pressure area in terms of rotating stall and surge risk. Once the threshold value is attained, i.e., once out of the risk area in terms of rotating stall and surge, lowering in the degree of opening of the valve allows reducing the air flow and speed in the air extraction pipes.

This type of speed and extraction air flow regulation allows having a section of pipe that is less than that of a system without a regulation valve. In fact, an extraction system without a regulation valve will have an equivalent extraction pipe diameter which will be dimensioned to pass the maximum flow without attaining speeds close to 0.4 Mach. An equivalent lower diameter will very rapidly attain speeds close to 0.4 Mach. The progressive closure of the valve, however, will ensure a speed reduction in the extraction pipe.

The extraction points are preferably located at intermediate stages of the turbomachine, and particularly on a number of stages between about 30% to about 70% of the total number of stages. Preferably, when the compression rotation speed exceeds the threshold value, the degree of opening of the value reduces continuously when the rotation speed of the compressor increases.

When the compressor rotation speed attains the rated rotation speed of the compressor, the final value of the degree of opening of the valve is advantageously selected in a manner that the air flow in the air extraction pipe does not cause any risk of rotating stall and surge. When the compressor rotation speed exceeds the predetermined threshold value, the degree of opening of the value according to the rotation speed of the compressor can be a decreasing linear function or a decreasing function of several linear portions of different slopes.

The predetermined threshold value is preferably selected in a manner that the air extraction speed does not exceed 0.4 Mach (i.e., the air extraction speed (in each extraction pipe) and the sound speed ratio does not exceed 0.4). In fact, this maximum speed allows satisfactory mechanical resistance in the air extraction pipes. At least one of the air extraction pipes can be connected, particularly in parallel, to the cooling ports in the turbine part of the turbomachine, in a manner as to ensure their cooling, particularly once the valve is closed.

The turbomachine is typically a gas turbine. The invention is also aimed at the turbomachine for implementation of a process described above. The turbomachine may include a compressor, air extraction pipes connecting the compressor to a turbomachine exhaust area or the atmosphere. At least one of the pipes is fitted with a flow regulation valve. Each valve has an adjustable degree of opening. Furthermore, the turbomachine may include, for each valve, appropriate control devices for complete opening of the valve when the compressor rotation speed is less than a predetermined threshold value beyond which there is no longer any risk of rotating stall and surge and reducing the degree of opening of the valve when the compressor rotation speed exceeds the said threshold value.

BRIEF DESCRIPTION OF THE DRAWINGS

Other characteristics and benefits of this invention clearly appear on reading of the following description provided as by way of illustrative and non-limiting example in reference to the designs attached in which.

DETAILED DESCRIPTION

Figure 2:
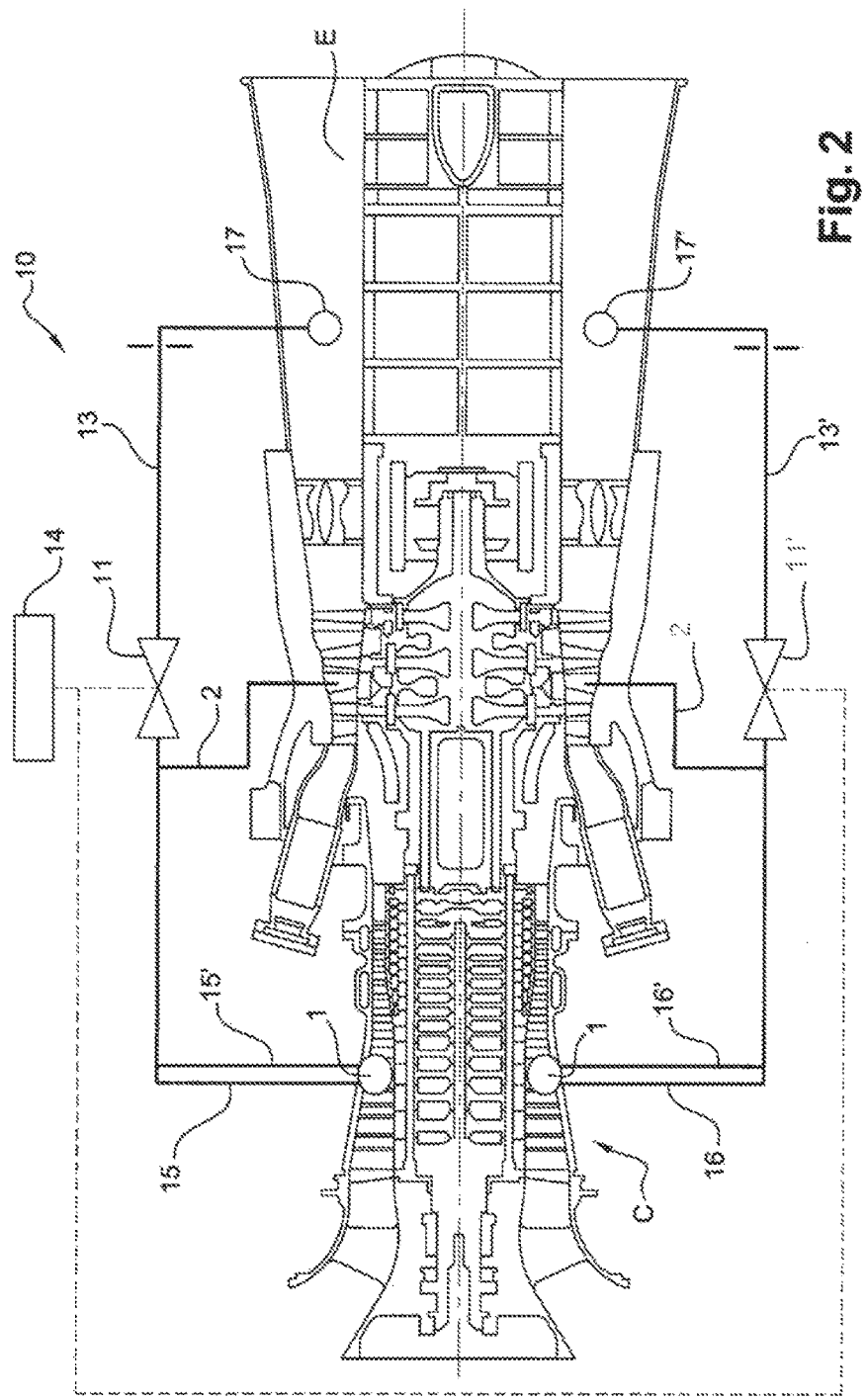
FIG. 2 illustrates a gas turbine allowing implementation of the process according to the invention.
Figure 3:
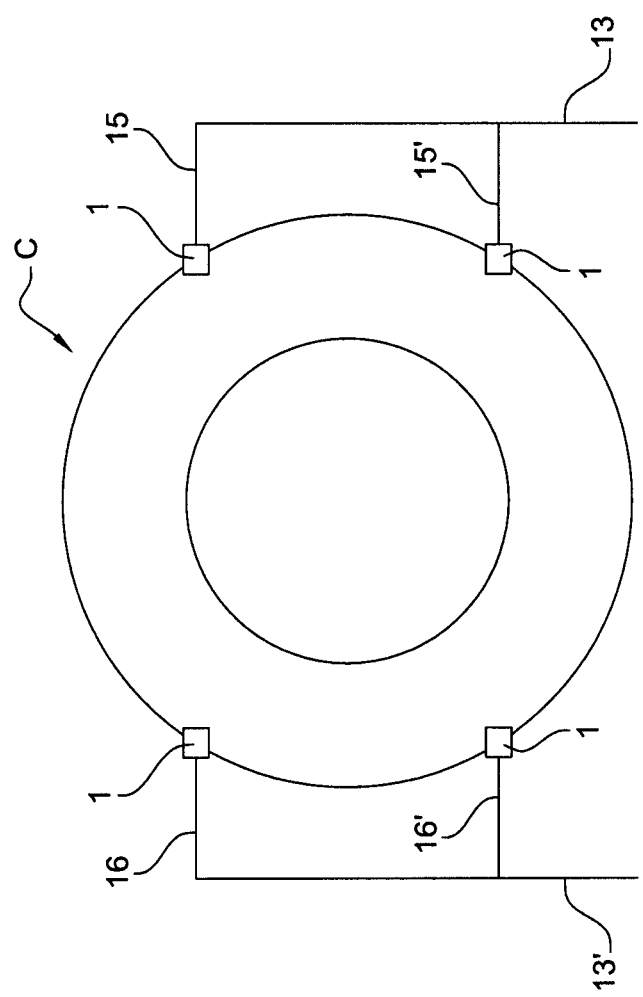
FIG. 3 is a partial transverse section view of the turbine.

Referring now to the drawings, in which like numerals refer to like elements throughout the several views, a gas turbine 10, as illustrated in FIG. 2, is fitted with an axial compressor C, meant to compress external air. At least two extraction points 1, preferably four, are provided on the external perimeter of the compressor C. By way of example, four extraction points 1 were represented in FIG. 3. For example, the extraction points 1 can be equidistant (FIG. 3) in order to ensure extraction balance. The extraction points 1 can be located at different stages of the turbine 10, or preferably, at a same stage. The extraction points are preferably located at intermediate stages of the turbine 10, and particularly on a numbers of stages between about 30 to about 70% of the total number of stages.

Each extraction point 1 is connected to an air extraction pipe 15, 15', 16, 16'. The extraction pipes 15, 15', 16, 16' can be regrouped in groups of two in an interconnection pipeline 13, 13' that ends in the inlets 17, 17' of an exhaust area E of the turbine 10 or in the atmosphere (outside the turbine 10). However, this grouping is optional and it can be envisaged that all of the extraction pipes 15, 15', 16, 16' end in the exhaust area E. Also, all of the extraction points 1 can be connected to a single extraction pipe.

Valves 11, 11' controlled by a controlling system 14 are designed to ensure the air extraction flow regulation of the compressor C towards the exhaust E. A valve 11, 11' can be fitted on each interconnection pipe 13, 13'. It can be envisaged to use expansion devices for each interconnection pipe 13, 13' in order to compensate for the close relocation of the connection with exhaust E, as well as devices to limit the maximum flow. It is also possible to connect the pipes 2 to the interconnection pipes 13, 13' to cool the different stages of the turbine 10 in rated operation. It is to be noted that the pipes 2 that carry the air from the compressor C to the cooling of the turbine wicket gates present considerable load losses.

Figure 4:
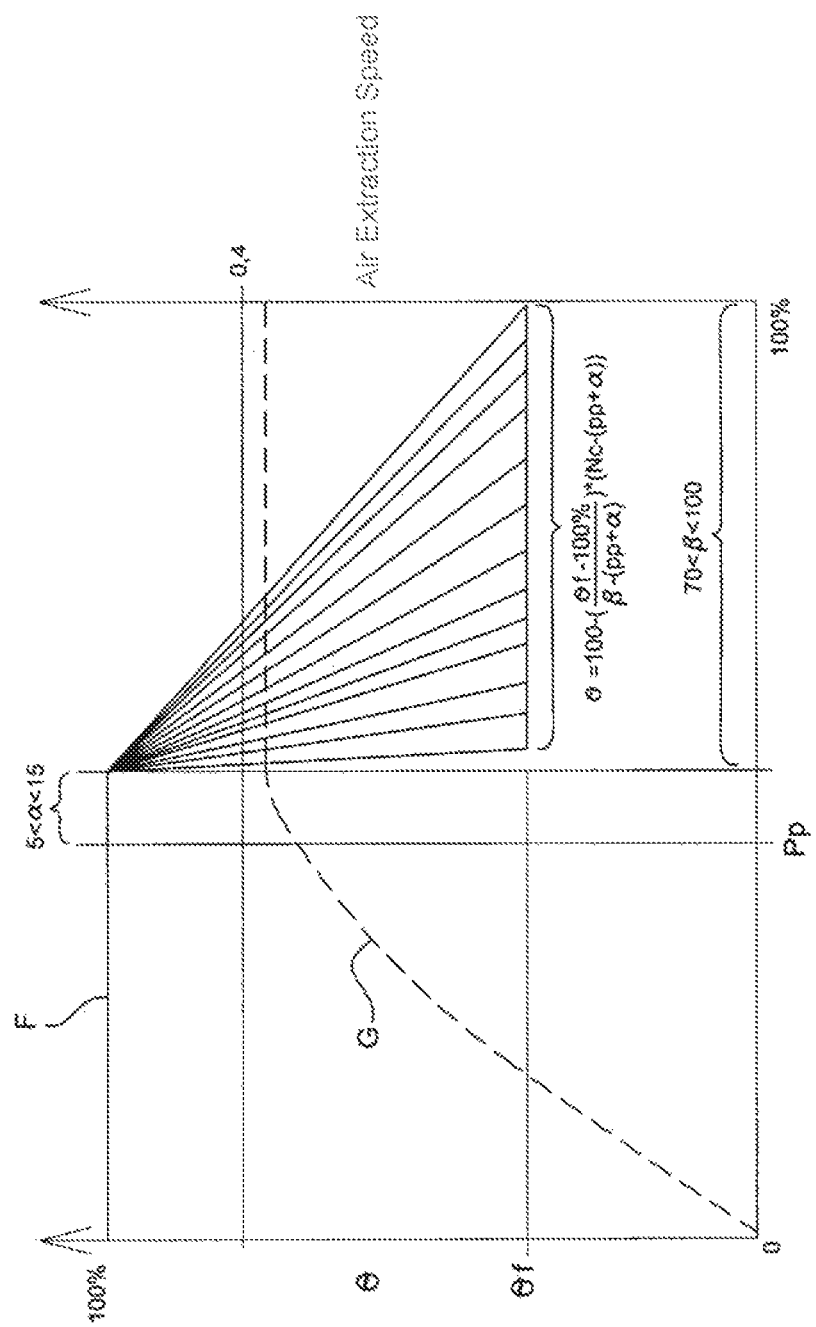
FIG. 4 is a useful diagram for understanding the process.

To prevent very high air extraction speeds, and in order to reduce the diameter of the pipes, the process according to the invention may include reducing the air extraction flow once away from any risk of rotating stall and surge. FIG. 4 shows the curve F representing the change in the degree of opening Θ of the valve 11, 11' according to the compressor rotation speed C (in percentage of rated rotation speed), as well as the curve G representing the change in air extraction speed (in number of Mach) according to the compressor rotation speed C.

Figure 1:
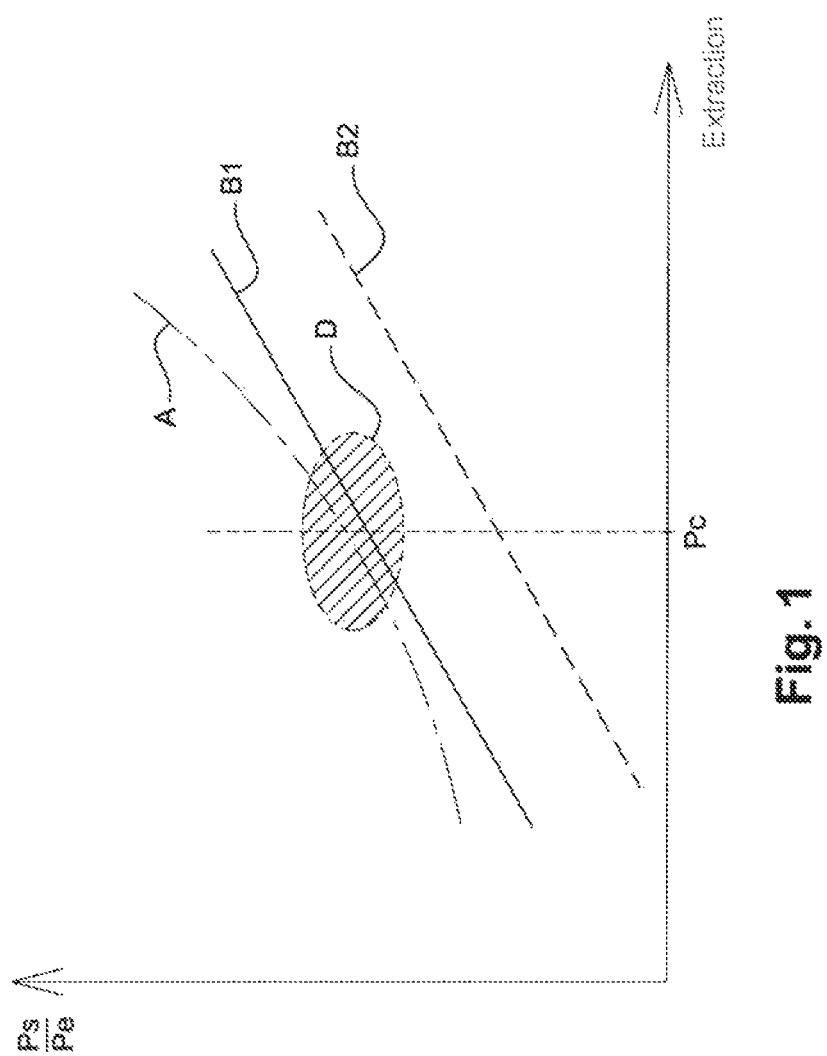
FIG. 1, already described, is a useful diagram for understanding of the invention.

The process may include a first step in which one valve 11, 11' is completely open, in a manner so as to avoid the critical D rotating stall and surge risk area illustrated in FIG. 1, followed by a second step in which we continuously reduce the degree of opening of the valve 11, 11', up to a final degree of opening Θf corresponding to the rated rotation speed of the compressor C. The final degree of opening Θf is advantageously selected in a manner that the air flow in the pipe does not lead to the risk of rotating stall and surge.

It is to be noted that at least one of the valves 11, 11' follows the law of change of the process, and preferably all the valves 11, 11'. Each valve 11, 11' can follow the same law of change or a different law of change. In an example of execution, the law of change of the degree of opening of the valve according to the compressor rotation speed can use two variables α and β which are fixed according to the characteristics of the compressor, and particularly of its size and its flow. α is a margin after the value Pp of the compressor rotation speed corresponding to the critical point ("pinch point" in English) to trigger the gradual closure of the valve. This value can depend on the size and flow of the compressor. The value a can, for example, be between about 5% to about 15% of the compressor rotation speed. β is a constant allowing defining the speed to attain the final closing position of the valve. The degree of opening Θ of the valve can follow a linear law represented by the following equation:

$$\theta = 100 - \left(\frac{\theta f - 100\%}{\beta - (pp + \alpha)}\right) * (Nc - (pp + \alpha))$$

Θ: percentage of opening of the valve;

Θf: the final percentage of opening of the valve when the compressor rotation speed reaches the rated value;

α: the margin in percentage of rotation speed beyond the critical point (5<α<15%);

β: percentage of speed to attain θf (70<β<100%);

Nc: corrected rotation speed of the compressor (in percentage).

Thus, several slopes of the degree of opening Θ of the valve are possible for the closure of the valve according to the variables α, β and Θf. Different slopes are illustrated in FIG. 4.

The variation in the degree of opening of the valve according to the compressor rotation speed can be represented by any decreasing function, whether it is rectilinear or not, or may include several rectilinear portions of different slopes. The process can be implemented during start-up or shutdown of the compressor. In case of shutdown of the compressor, the diagram of FIG. 4 is to be read from right to left, in the direction of decreasing rotation speed, whereas it is to be read in the direction of increasing rotation speeds in case of start-up of the compressor.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A process for preventing rotating stall and surge in a compressor of a turbomachine, with air extraction pipes connecting the compressor to an exhaust area of the turbomachine or to the atmosphere, at least one of the air extraction pipes including an air regulation valve, and each valve including an adjustable degree of opening, comprising, for at least one of the valves:
    a command for completely opening the valve when the compressor rotation speed is less than a predetermined threshold value; and
    a command for lowering the degree of opening of the valve when the compressor rotation speed exceeds the predetermined threshold value, wherein the degree of opening of the valve when the compressor rotation speed exceeds the predetermined threshold value is lowered based at least in part on a final percentage of opening, a margin of pitch point, a margin of a percentage of speed to attain, and a corrected rotation speed of the compressor.

2. The process according to claim 1, wherein when the compressor rotation speed exceeds the predetermined threshold value, the degree of opening of the valve lowers continuously when the compressor rotation speed increases.

3. The process according to claim 1, wherein when the compressor rotation speed attains a rated rotation speed of the compressor, a final value of the degree of opening is selected such that the air flow in the air extraction pipes does not cause rotating stall and surge.

4. The process according to claim 1, wherein when the compressor rotation speed exceeds the predetermined threshold value, the degree of opening of the valve according to the compressor rotation speed is a decreasing linear function or a decreasing function of several linear portions of different slopes.

5. The process according to claim 1, wherein the predetermined threshold value is selected such that an air extraction speed and sound speed ratio does not exceed 0.4.

6. The process according to claim 1, wherein at least one of the air extraction pipes is connected to a wicket gate of the turbomachine for cooling.

7. The process according to claim 1, wherein the turbomachine is a gas turbine.

8. The process according to claim 1, wherein the predetermined threshold value is between about 5 to about 15% of the compressor rotation speed above the compressor critical point.

9. A turbomachine, comprising:
    a compressor;
    air extraction pipes connecting the compressor to a turbomachine exhaust area or to the atmosphere;
    at least one of the pipes comprising a flow regulation valve with an adjustable degree of opening; and
    a control device;
    the control device providing instructions to:
        open completely the valve when the compressor rotation speed is less than a predetermined threshold value, and
        reduce the degree of opening of the valve when the compressor rotation speed exceeds the threshold value, wherein the degree of opening of the valve when the compressor rotation speed exceeds the predetermined threshold value is reduced based at least in part on a final percentage of opening, a margin of pitch point, a margin of a percentage of speed to attain, and a corrected rotation speed of the compressor.

* * * * *